(12) United States Patent
McMahan et al.

(10) Patent No.: US 7,809,825 B2
(45) Date of Patent: Oct. 5, 2010

(54) DISSOLVING NETWORK RESOURCE MONITOR

(75) Inventors: Paul F. McMahan, Apex, NC (US); Patrick R. Guido, Cary, NC (US); Robert C. Leah, Cary, NC (US); Kent F. Hayes, Jr., Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1361 days.

(21) Appl. No.: 10/839,660

(22) Filed: May 5, 2004

(65) Prior Publication Data

US 2005/0251572 A1 Nov. 10, 2005

(51) Int. Cl.
G06F 15/173 (2006.01)

(52) U.S. Cl. ...................... 709/224; 709/223

(58) Field of Classification Search .................. 709/223, 709/224
See application file for complete search history.

(56) References Cited

U.S. PATENT DOCUMENTS

| | | | | |
|---|---|---|---|---|
| 5,542,047 | A * | 7/1996 | Armstrong | 709/224 |
| 5,796,633 | A * | 8/1998 | Burgess et al. | 702/187 |
| 5,802,303 | A * | 9/1998 | Yamaguchi | 709/224 |
| 6,026,500 | A * | 2/2000 | Topff et al. | 714/26 |
| 6,049,798 | A | 4/2000 | Bishop et al. | |
| 6,070,190 | A * | 5/2000 | Reps et al. | 709/224 |
| 6,085,244 | A | 7/2000 | Wookey | |
| 6,115,393 | A | 9/2000 | Engel et al. | |
| 6,122,664 | A * | 9/2000 | Boukobza et al. | 709/224 |
| 6,125,390 | A * | 9/2000 | Touboul | 709/223 |
| 6,421,737 | B1 * | 7/2002 | Stone et al. | 719/318 |
| 6,622,155 | B1 | 9/2003 | Haddon et al. | |
| 6,665,267 | B1 | 12/2003 | Iwasaki et al. | |
| 6,928,394 | B2 * | 8/2005 | Bauchot et al. | 702/188 |
| 7,003,560 | B1 * | 2/2006 | Mullen et al. | 709/223 |
| 7,143,129 | B2 * | 11/2006 | Barillaud | 709/202 |
| 7,209,863 | B2 * | 4/2007 | Fukuda et al. | 702/186 |
| 2001/0025371 | A1 * | 9/2001 | Sato et al. | 717/4 |
| 2002/0112040 | A1 * | 8/2002 | Chang et al. | 709/223 |
| 2002/0178090 | A1 | 11/2002 | Dahut | |
| 2003/0023656 | A1 | 1/2003 | Hutchison et al. | |
| 2003/0028627 | A1 * | 2/2003 | Barillaud | 709/222 |

(Continued)

OTHER PUBLICATIONS

Bunch et al., Software Agents for Process Monitoring and Notification, Mar. 2004, 2004 ACM Symposium on Applied Computing, p. 94-99.*

*Primary Examiner*—Aaron Strange
(74) *Attorney, Agent, or Firm*—Coats & Bennett PLLC (57) ABSTRACT

A network monitoring application deploys conventional monitor applications to network nodes and receives diagnostic events from the monitors. In response to a monitor reporting a high severity event or condition, the monitor application automatically deploys a dissolving monitor to the network node that automatically ceases operation at the conclusion of a predetermined lifespan. The dissolving monitor automatically reports verbose diagnostic events to the monitoring application, including diagnostic events not reported by the conventional monitor. The dissolving monitor removes itself from the node at the end of its lifespan by freeing all resources of said node that it consumed. In some embodiments, the dissolving monitor reports diagnostic events with decreasing frequency prior to its dissolution. The dissolution of the dissolving monitor may be triggered by time since its deployment, performance and status of the monitored node, error or anomaly counts, or combinations thereof.

19 Claims, 5 Drawing Sheets

U.S. PATENT DOCUMENTS

| | | | |
|---|---|---|---|
| 2003/0039216 A1* | 2/2003 | Sheldon et al. | 370/260 |
| 2003/0110392 A1* | 6/2003 | Aucsmith et al. | 713/200 |
| 2003/0204621 A1* | 10/2003 | Poletto et al. | 709/239 |
| 2003/0229693 A1 | 12/2003 | Mahlik et al. | |
| 2004/0019672 A1* | 1/2004 | Das et al. | 709/223 |
| 2004/0073648 A1* | 4/2004 | Tanino et al. | 709/223 |
| 2004/0088646 A1* | 5/2004 | Yeager et al. | 715/500 |

* cited by examiner

Monitoring Application deploys a Dissolving Monitor to the Resource.

FIG. 3B

Monitored Resource sends a high severity event or condition to Monitoring Application.

FIG. 3A
Prior Art

Monitored Resource sends terse diagnostic events to Monitoring Application.

Dissolving Monitor sends verbose diagnostic events to Monitoring Application.

FIG. 3F

Over time, Dissolving Monitor sends fewer and fewer events. Eventually removes itself from the Resource.

DISSOLVING NETWORK RESOURCE MONITOR

BACKGROUND

The present invention relates generally to the field of computer network management and in particular to a method of automatically monitoring critical network nodes via a self-terminating monitor application.

The ever-increasing capacity and throughput of computer networking technology has resulted in deployed computer networks of vast size and complexity. As the size and complexity of networks continues to grow, monitoring the health and status of network components and efficiently managing network resources becomes increasingly difficult. One known method of network monitoring and management deploys a "monitor" to some or all network or computing resources in the network, referred to herein as network "nodes." This conventional monitor is an autonomous application that monitors the node's status and performance, and transmits event, status, and/or diagnostic information to one or more monitoring applications. A single monitoring application may monitor and control a subnet or other logical subset of network nodes, or alternatively may monitor and control the entire network.

Particularly in large networks, the amount of diagnostic and monitoring traffic generated between a monitoring application and a plurality of monitors may be significant. In addition to consuming network resources (i.e., bandwidth), heavy diagnostic traffic tends to drown critical "signal" in routine, non-critical "noise." That is, important event and status information from network resources experiencing overloaded conditions, partial or total failures, or the like, may be difficult to extract from a large stream of routine, perfunctory status information and usage statistics continuously reported by conventional monitors running on healthy network nodes.

In addition, the type and granularity of information reported by conventional network monitors, while sufficient for routine maintenance tasks such as load balancing, is often insufficient to diagnose failures or other criticalities within the network. Thus, even when system management personnel are able to identify critical resource monitor reports, the reports often contain insufficient information to allow thorough diagnostics and troubleshooting.

SUMMARY

The present invention relates to a method of monitoring a node in a network by a monitoring application. Information about the node is monitored and automatically reported to the monitoring application by a first monitor running on the node. In response to information reported by the first monitor, a second monitor that automatically ceases operation at the conclusion of a predetermined lifespan is automatically transmitted to the node. During the lifespan of the second monitor, the monitoring application monitors information about the node automatically reported by the second monitor, including information that is not reported by the first monitor.

DETAILED DESCRIPTION

The present invention addresses computer network system management needs by automatically deploying a dissolving monitor to network nodes that report critical events or status. The dissolving monitor automatically gathers and reports back to a monitoring application verbose, detailed diagnostic, status and event information. This allows system management personnel to both more quickly identify critical network nodes, and to perform meaningful diagnostics and troubleshooting. Over time, and in response to a variety of conditions (as explained below), the dissolving resource monitor transmits reports less and less frequently, and eventually ceases operation and removes itself from the relevant network node by releasing the node resources it consumed. According to exemplary embodiments of the present invention, the detection of critical events/status, the deployment and operation of the dissolving monitor, and the purging of the dissolving monitor from the node to which it is deployed, all occur automatically.

Figure 1:
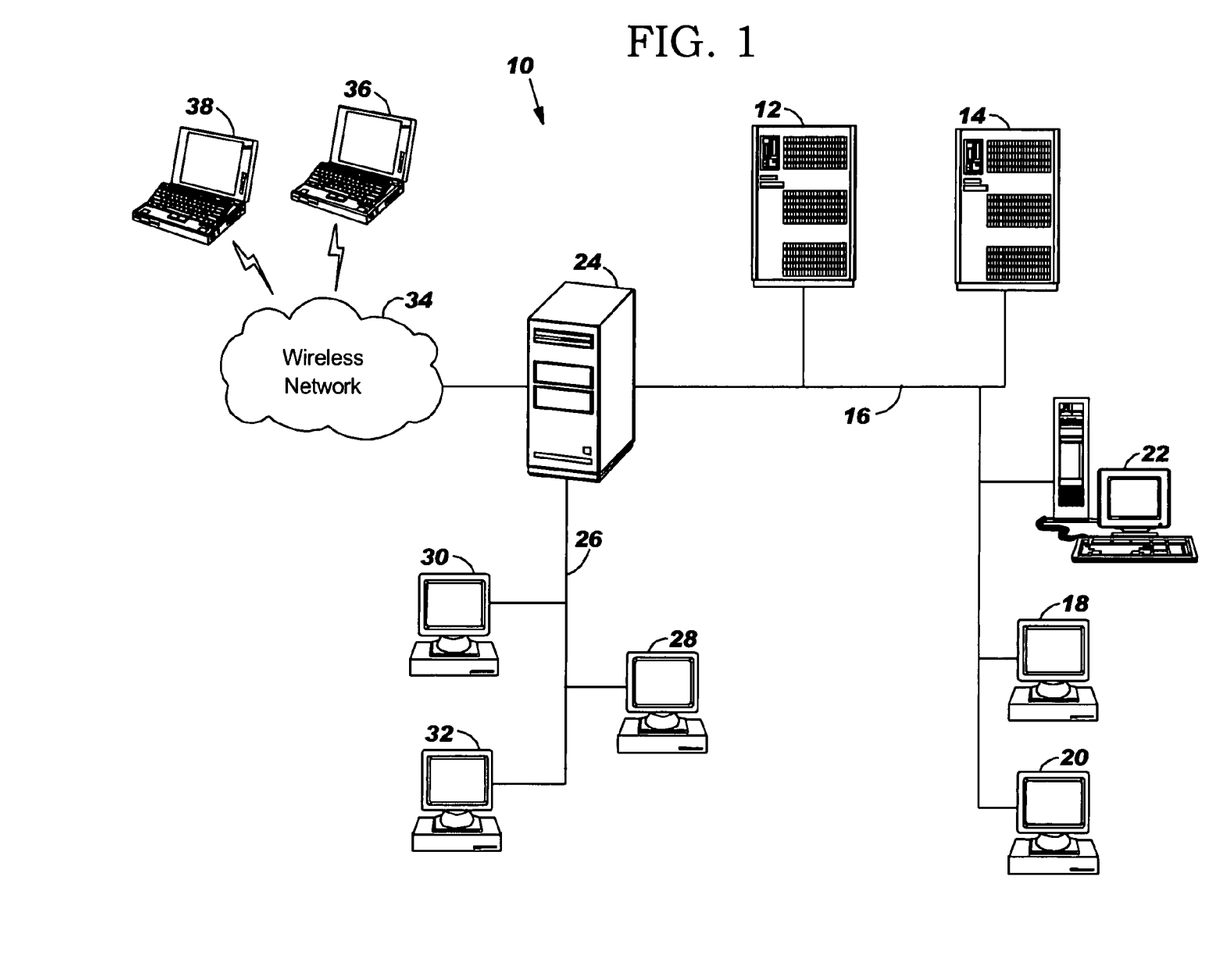
FIG. 1 is a diagram of a representative computer network.

FIG. 1 depicts a representative computer network, indicated generally by the numeral 10, in which the dissolving resource monitor of the present invention may find utility. The network 10 may include a file server 12, compute server 14, and other servers, as necessary or desired. Servers 12, 14 are connected by a high speed computer Local Area Network (LAN) 16, which may for example comprise an Ethernet, FDDI, Token Ring or the like, as well known in the art. While the LAN 16 is depicted as a bus, it may alternatively be implemented as a point-to-point, star, ring, or hub configuration, as well known in the art. In general, LAN 16 may comprise any local area computer network technology, topology or protocol, now known or later developed. Client computers 18, 20 may additionally be connected to the LAN 16.

Also connected to the LAN 16 is a computer or workstation 22, which may be dedicated to system maintenance. As discussed more fully herein, computer 22 may execute a resource monitor software application, which is operative to receive and analyze event and status information from a plurality of monitors deployed to nodes in the network 10.

The LAN 16 may be connected via one or more gateways 24 to one or more additional LANs 26, which like LAN 16, may be of any type, as necessary or desired. LAN 26 may operatively connect a plurality of computers 28, 30, 32 to LAN 16 through gateway 24, as known in the art. In addition, the gateway 24 may connect to a wireless network 34, which provides wireless networking communications with computers 36, 38. In general, all compute resources, such as servers 12, 14, monitor computer 22, client computers 18, 20, 28, 30, 32, 36, 38, and gateway 24, as well as other compute and/or networking resources in the network 10, such as the various components of wireless network 34 and the like, are referred to herein as network "nodes," and may be hosts of a dissolving monitor according to the present invention. Those of skill in the art will readily recognize that the computer network 10 depicted in FIG. 1 is representative only; the present invention may be utilized in a wide variety of types and configurations of computer networks 10.

Figure 2:
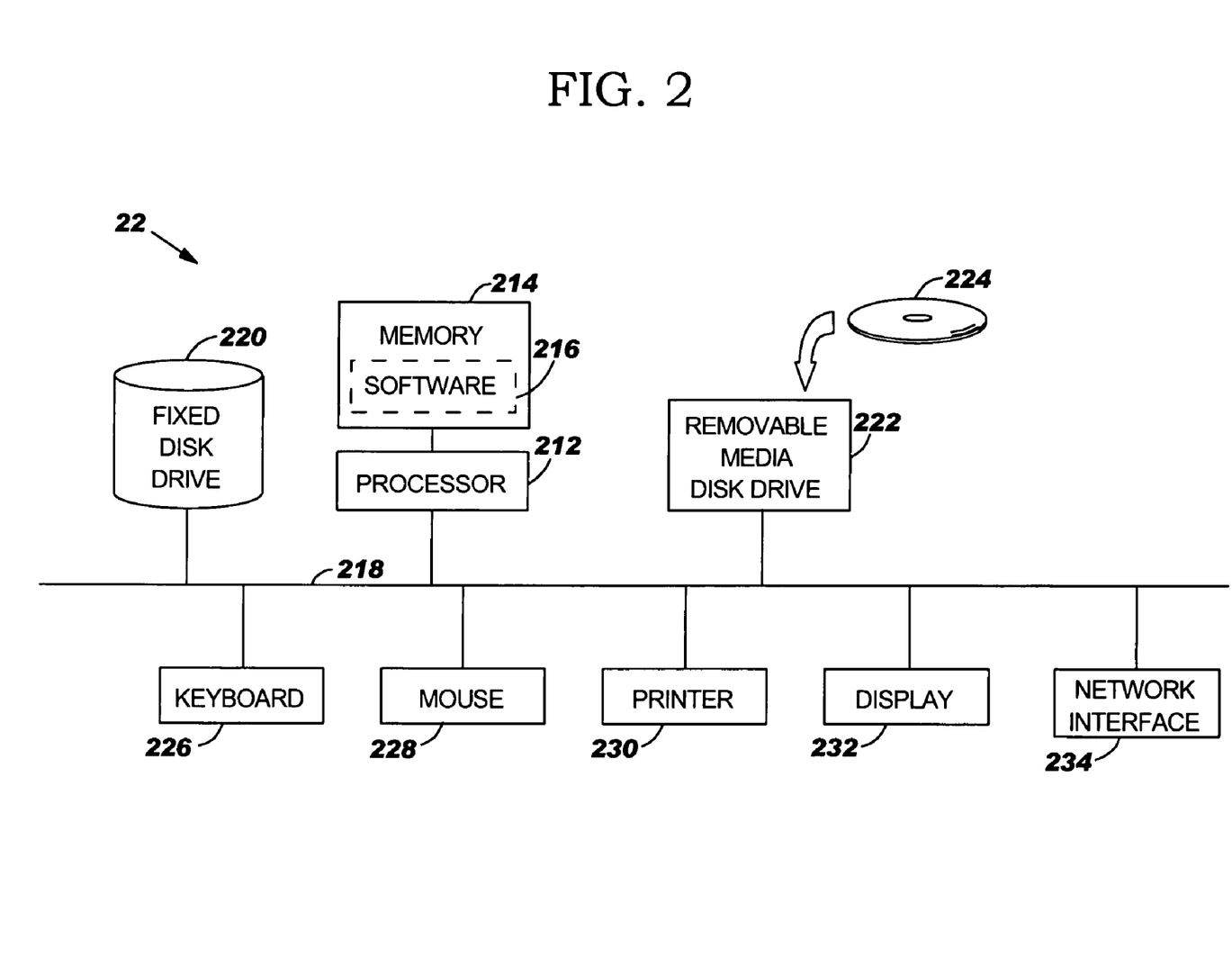
FIG. 2 is a functional block diagram of a computer.

FIG. 2 depicts a representative functional block diagram the network monitoring computer system 22. The computer system 22 includes a processor 212 capable of executing stored instructions. Connected to the processor 212 is memory 214 that, in operation, stores software 216. Software 216 may include, in addition to operating systems and the like, a monitoring application that deploys and receives status reports from a plurality of resource monitor applications.

The processor 212 is connected to a bus 218, to which are connected a variety of data storage devices and input and output devices. The bus 218 may comprise, for example, a Peripheral Component Interconnect (PCI) bus, or other standard buses known in the art, such as Accelerated Graphics Port (AGP), Extended Industry Standard Architecture (EISA), or the like. A fixed disk drive 220 containing a computer-readable medium, from which software 216 may be loaded into memory 214, may be attached to the bus 218. Additionally, a removable media disk drive 222 that receives removable computer-readable media 224 may be attached to the bus 218. The removable media 224 may comprise a floppy disk, a CD-ROM or DVD-ROM, a magnetic tape, high-capacity removable media, or the like. Removable media 224 may contain a variety of digital data, and in particular may contain software 216, including operating system software such as UNIX, AIX, LINUX, Windows or the like, as well known in the art. Software 216 may also comprise network resource monitoring applications. The software 216 may be copied from the removable media 224 to the fixed disk drive 220, and subsequently loaded into memory 214 from the fixed disk drive 220. Alternatively, the software 216 may be loaded directly from the removable media 224 into the memory 214.

Also connected to the bus 218 are input devices such as a keyboard 226 and a mouse 228, as well known in the art. The computer system 22 may include output devices such as a display device 232 and a printer 230. In addition, the computer system 22 includes a network interface 234, which provides data communications connectivity between the computer 22 and the LAN 16.

Those of skill in the art will readily recognize that the computer system 22 of FIG. 1 is representative only, and may, in any given implementation or embodiment, omit one or more functional blocks, and/or include additional functionality. The depiction of a computer system 22 and accompanying description do not limit the scope of the present invention, which may be advantageously utilized on any computer system capable of data communications with disparate network resources. In operation, software 216 executing on the computer system 22 deploys and receives reports from conventional resources monitor applications and, according to the present invention, automatically deploys a dissolving resource monitor in response to information reported by a conventional resource monitor.

Figure 3A:
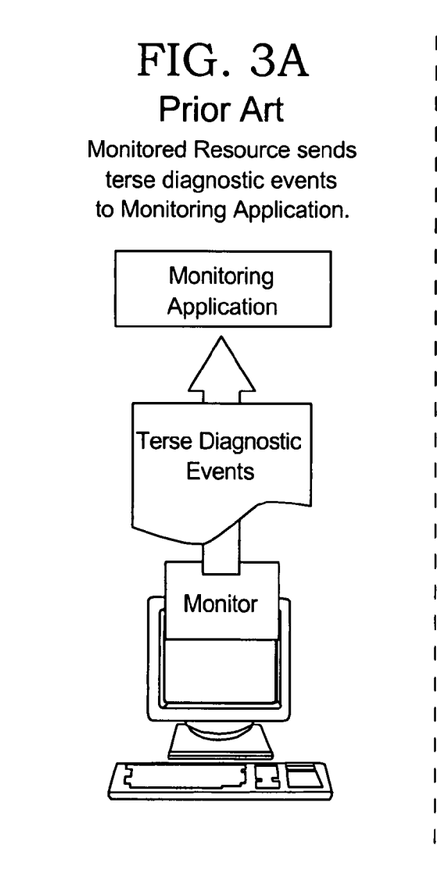
FIGS. 3A-3F depict the transfer and reporting of a dissolving resource monitor according to the present invention.

FIG. 3A depicts the data flow relationship between a deployed conventional resource monitor application running on a monitored node, and a monitoring application, for example running on computer 22 on the LAN 16. Periodically, or alternatively upon pre-specified conditions, the conventional resource monitor transmits to the monitoring application terse diagnostic events. As used herein, the term "diagnostic events" includes events such as buffer overflows, storage or compute resource failures, network retransmissions or other errors in excess of a threshold, and the like. The term diagnostic events may additionally include reports of system, subsystem or network status, performance levels such as processor, memory, and/or communication bandwidth utilization, and the like. In general, the term diagnostic events is to be construed broadly, and includes any or all of the network and/or compute resource (i.e., node) monitoring, maintenance, and troubleshooting data that may be communicated between a deployed resource monitor application and a network monitoring application.

To minimize the use of network bandwidth, and to avoid overwhelming system management personnel with excessive amounts of data, the diagnostic events reported by a conventional monitor to a monitoring application are typically limited in both volume and detail. While this reduces overhead associated with the monitoring process and hence improves network operational efficiency, the diagnostic events reported by a conventional resource monitor are typically too terse to perform meaningful diagnostics or troubleshooting when such action is warranted by the diagnostic events.

Figure 3B:
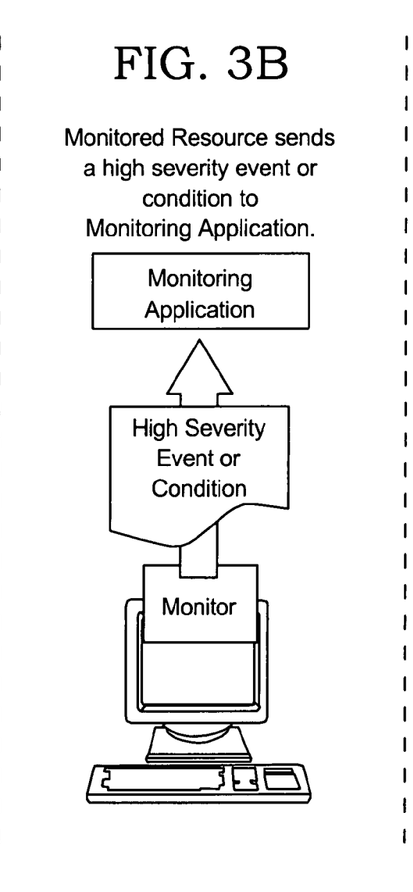

FIG. 3B depicts the conventional resource monitor reporting to the monitoring application a high severity event or condition. What constitutes a high severity event or condition may vary, depending on the resource being monitored. In general, the preferred operating parameters and status of a given network node are known, and are programmed into the resource monitor prior to its deployment. Additionally or alternatively, the monitoring application may dynamically alter the thresholds or conditions that the deployed resource monitor uses to detect and report a high severity event or condition. Such (re)configuration of high severity event or condition triggers is well known to those of skill in the art.

Figure 3C:
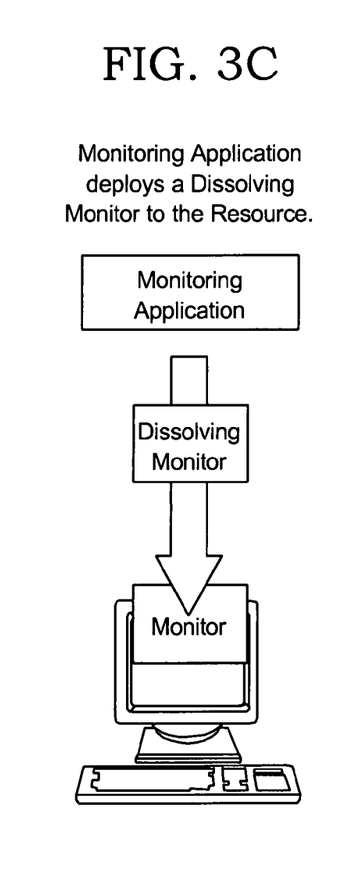

According to the present invention, in response to a high severity event or condition reported to the monitoring application by a conventional resource monitor, the monitoring application will transfer or "download" a dissolving monitor to the relevant network node. The dissolving monitor is an autonomous application that monitors the network node to which it is deployed, transmits intense and verbose reports of diagnostic events from the network node to the monitoring application for a predetermined lifespan, and then removes itself from the node.

Figure 3D:
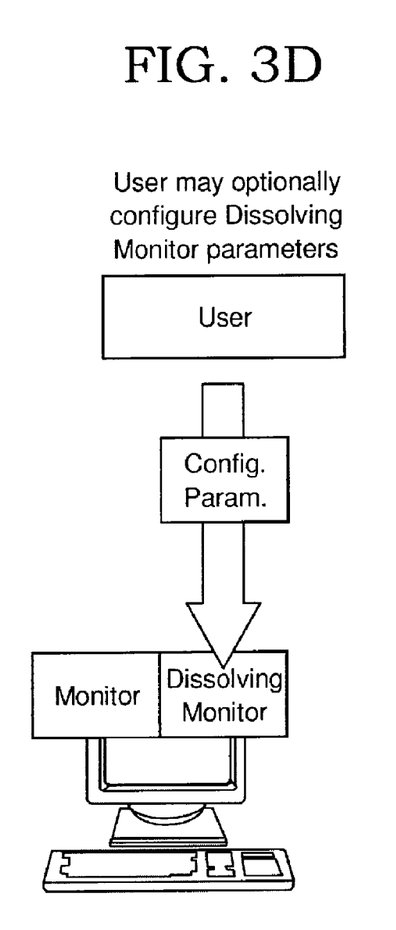
Figure 3E:
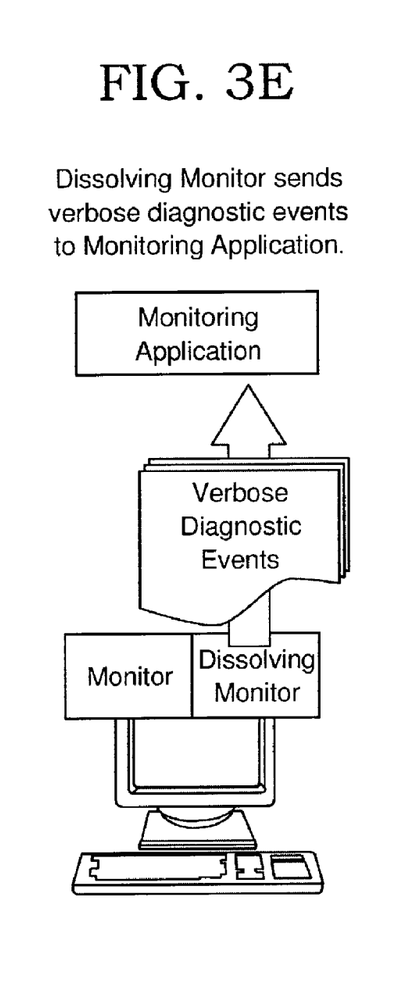
Figure 3F:
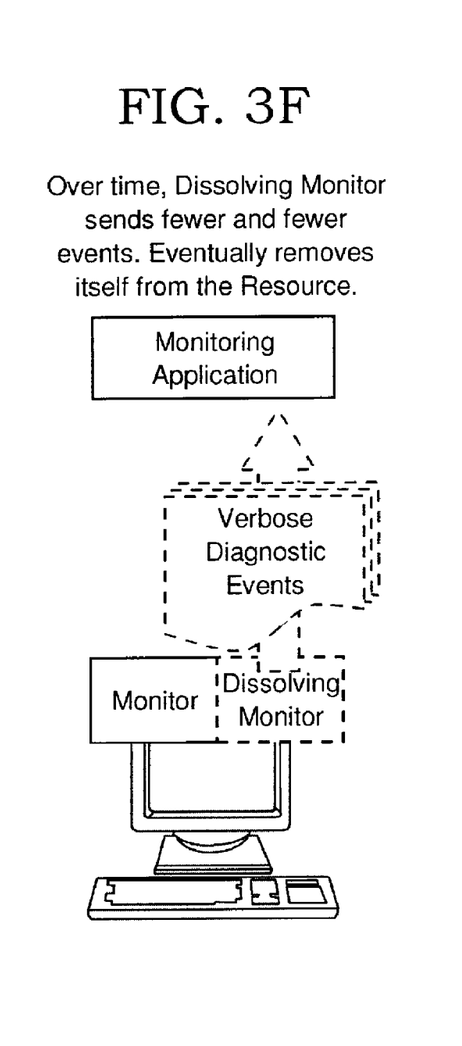

The dissolving monitor is preferably in the form of a device-independent executable language, and is most preferably in the form of a device-independent executable applet in the JAVA programming language promulgated by Sun Microsystems, Inc. Alternatively, the dissolving monitor may be written in C, C++ or any other high-level language, or in assembly code or any other language specific to the network node to which the dissolving monitor is deployed. The monitoring application may generate the dissolving monitor "on the fly" upon receiving the high severity event or condition report, such as by using predetermined criteria that match the type and parameters of the reporting network node to which the dissolving monitor is to be deployed. Alternatively, the monitoring application may retrieve an appropriate dissolving monitor from memory, disc, or other storage media. Once deployed, the dissolving monitor may receive configuration parameters, such as a lifespan, sent by a user, as depicted in FIG. 3D.

As depicted in FIG. 3 E, the dissolving monitor reports extensive and verbose diagnostic events regarding the network node to the monitoring application. The dissolving monitor reports diagnostic events that the conventional resource monitor does not —that is, the diagnostic events reported by the dissolving monitor may be a superset of the diagnostic events reported by a conventional monitor deployed to the same node. This allows for meaningful troubleshooting by system maintenance personnel monitoring the monitoring application. In addition, the dissolving monitor preferably extensively timestamps the verbose diagnostic events reported to the monitoring application, to provide a timeline of events to further facilitate troubleshooting. By way of example and without limitation, the verbose diagnostic events reported to the monitoring application by the dissolving monitor may include information such as CPU load, memory availability and usage, disk usage, network interface throughput, network interface error or retransmission rate, and the like.

In one embodiment, as depicted in FIG. 3 F, the frequency with which the dissolving monitor reports verbose diagnostic events to the monitoring application decreases over time. When the frequency of event reporting decreases to a predetermined threshold, the dissolving monitor ceases all diagnostic event and status reporting, and automatically purges itself from the network node on which it is executing. That is, the dissolving monitor ceases operation, and releases the compute and memory resources it had previously been consuming. This termination of the dissolving monitor's operation occurs automatically —without intervention by system management personnel.

In this manner, extensive and detailed information is available to system management personnel immediately upon the automatic detection of a network abnormality or criticality, to facilitate troubleshooting. Over time, and as the abnormality or criticality is presumably addressed and mitigated or eliminated, the verbose diagnostic event reporting by the dissolving monitor continues at a lower frequency, to allow system management personnel to monitor the "fix," and ensure proper operation of the network node following the event or condition that triggered the deployment of the dissolving monitor. Finally, as the need for verbose diagnostic event reporting diminishes and then disappears, so too does the dissolving monitor disappear, automatically freeing compute and memory resources at the network node to which it was deployed, and freeing up the network bandwidth necessary to transmit the verbose diagnostic events.

In another embodiment, the dissolving monitor may determine the rate and timing of its own demise according to predetermined or dynamically downloaded performance measurements. For example, if a disk overload generated an initial high severity event warning to the monitoring application, triggering the deployment of a dissolving monitor, the dissolving monitor may be programmed to dissolve upon the detection of a sufficient buffer of disk space. In yet another embodiment, the dissolving monitor may be programmed to dissolve upon a predetermined combination of available free disk space and the time duration of such availability. In this embodiment, a dissolving monitor may facilitate the detection and resolution of a periodic criticality, without incurring the network and compute overhead associated with deploying a new dissolving monitor upon each "flare up" of a recurring anomaly.

As used herein, the term "predetermined lifespan" encompasses all of these embodiments of automatic dissolving monitor dissolution. That is, the dissolving monitor may dissolve in a predetermined temporal duration following its deployment; as the monitored network node reaches predetermined performance levels (i.e., the "span" of its life is measured in error occurrences, units of performance or status); or some combination of the two. The thresholds and comparison conditions that determine the dissolving monitor's dissolution may be extant in the dissolving monitor as deployed, and/or they may be dynamically downloaded from the monitoring application, such as in response to input from system management personnel as they monitor the network criticality. In either case, the downloaded thresholds and comparison conditions are programmed into the dissolving monitor before the monitor's dissolution—hence, they are considered to define a "predetermined lifespan" as that term is used herein.

A significant advantage of the dissolving monitor according to the present invention is that its entire life cycle—from detection of a high severity event or condition, through deployment of the dissolving monitor, the verbose diagnostic event reporting by the dissolving monitor, and finally the dissolving monitor's dissolution—is automatic. As used herein, the term "automatic" means that direct intervention by system management personnel is not necessary or required.

In a typical network management scenario, by the time conventional resource monitors have detected an anomaly and alerted system maintenance personnel, one or more dissolving resource monitors according to the present invention will likely have already been deployed and will be actively reporting verbose diagnostic events to the monitoring application by the time diagnostic, troubleshooting and repair activities commence. Furthermore, the verbose diagnostic event reporting continues—with decreasing frequency—for a predetermined time, status, error count or level of performance, and then the dissolving monitors automatically cease operation and free up the resources of the nodes to which they were deployed and of the network. This may result in much faster and more efficient network diagnostic, troubleshooting and repair, and minimizes the active intervention necessary by system management personnel to optimize system performance following the resolution of a network anomaly or criticality.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of monitoring a particular node in a network by a monitoring application, the monitoring application executed on a computer attached to the network, the method comprising:
   monitoring information about said node automatically reported to said monitoring application by a first monitor running on said node;
   in response to information reported by said first monitor, automatically transmitting to said node a second monitor that runs on said node and reports diagnostic events in response to monitored conditions at said node, and that automatically ceases operation at the conclusion of a predetermined lifespan; and
   during the lifespan of said second monitor, monitoring information about said node automatically reported to said monitoring application by said second monitor, including information that is not reported by said first monitor.

2. The method of claim 1 wherein said second monitor is transmitted to said node in response to said first monitor reporting a high severity event or condition at said node.

3. The method of claim 1 wherein upon said second monitor ceasing operation, it removes itself from said node by freeing all resources of said node that it consumed.

4. The method of claim 1 wherein information about said node automatically reported to said monitoring application by said second monitor includes verbose diagnostic events not reported by said first monitor.

5. The method of claim 1 wherein said second monitor automatically reports information about said node to said monitoring application with decreasing frequency.

6. The method of claim 5 wherein said second monitor automatically ceases reporting information about said node to said monitoring application at the end of said lifespan.

7. The method of claim 1 wherein said predetermined lifespan is a predetermined temporal duration.

8. The method of claim 1 wherein said predetermined lifespan is a predetermined count of events occurring at said node.

9. The method of claim 1 wherein said predetermined lifespan is a predetermined level of performance of said node.

10. The method of claim 1 wherein said predetermined lifespan is a predetermined operational status of said node.

11. The method of claim 1 wherein said second monitor is in the form of a device-independent computer program.

12. The method of claim 11 wherein said second monitor is in the form of a JAVA applet.

13. A network, comprising:
a plurality of nodes, at least one particular said node having a first monitor running thereon;
a monitoring application running on a computer attached to said network automatically receiving information about said node from said first monitor; and
a second monitor that automatically ceases operation at the conclusion of a predetermined lifespan, automatically deployed from said monitoring application to said node in response to information received from said first monitor, said second monitor running on said node and automatically transmitting, during said lifespan, information about said node to said monitoring application, including information that is not reported by said first monitor.

14. The network of claim 13 wherein said second monitor automatically transmits said information with decreasing frequency prior to automatically ceasing operation.

15. The network of claim 13 wherein the predetermined lifespan of the second monitor is determined by at least one parameter set by a user in said monitoring application prior to said second monitor being automatically deployed to said node.

16. The network of claim 13 wherein the predetermined lifespan of the second monitor is determined by at least one parameter set by a user via said monitoring application after said second monitor is automatically deployed to said node.

17. A computer-readable medium that stores computer-executable process steps for monitoring a network comprising a plurality of nodes, at least one said node having a first monitor running thereon, said computer-executable process steps causing a computer to perform the steps of:
monitoring at least one said node by automatically receiving information about said node from said first monitor running on said node;
in response to information reported by said first monitor, automatically transmitting to said node a second monitor that runs on said node and reports diagnostic events in response to monitored conditions at said node, and that automatically ceases operation at the conclusion of a predetermined lifespan; and
during the lifespan of said second monitor, monitoring information about said node automatically reported to said monitoring application by said second monitor, including information that is not reported by said first monitor.

18. The computer-readable medium of claim 17, wherein monitoring information about said node automatically reported to said monitoring application by said second monitor comprises monitoring information about said node automatically reported with decreasing frequency by said second monitor during the lifespan of said second monitor.

19. The computer-readable medium of claim 17, said computer-executable process steps further causing a computer to perform the step of automatically generating a second monitor that automatically ceases operation at the conclusion of a predetermined lifespan and according to predetermined criteria, prior to transmitting said second monitor to said node.

* * * * *